(No Model.)
W. H. FITZ GERALD.
PITCHER STAND.
No. 282,875. Patented Aug. 7, 1883.
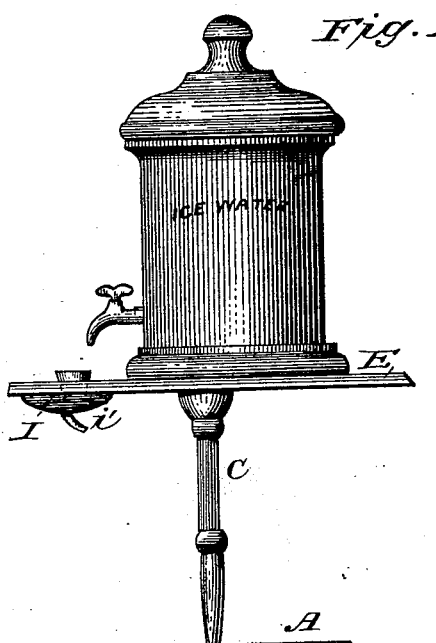
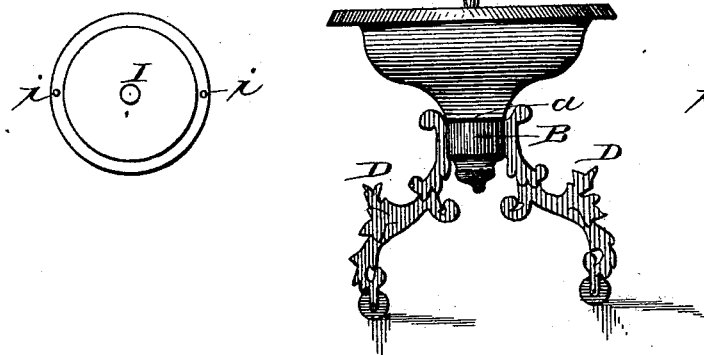
WITNESSES
INVENTOR
Attorney (No Model.) 3 Sheets—Sheet 2.
W. H. FITZ GERALD.
PITCHER STAND.
No. 282,875. Patented Aug. 7, 1883.
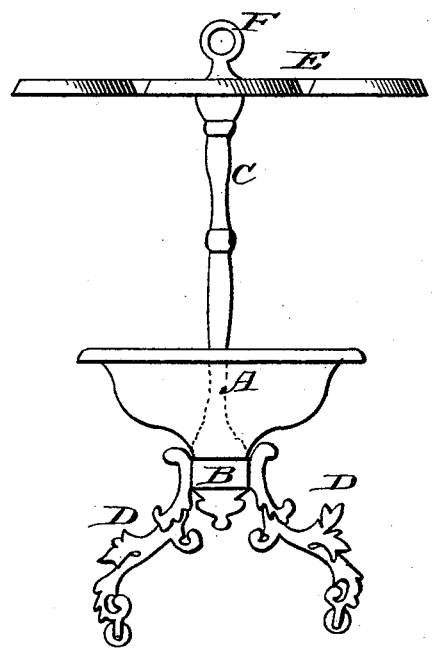
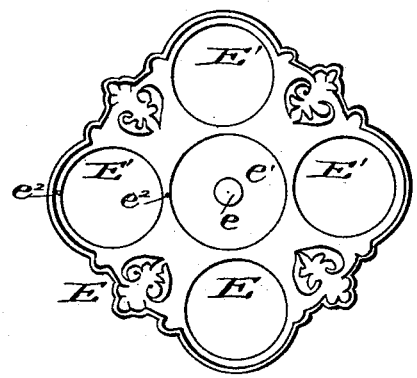
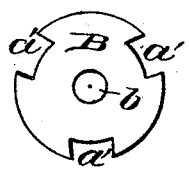
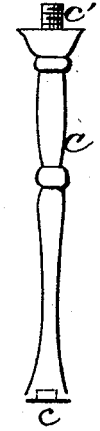
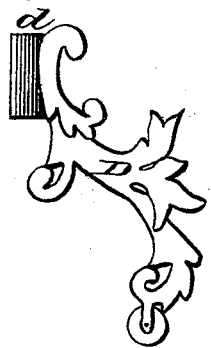
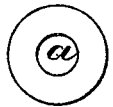
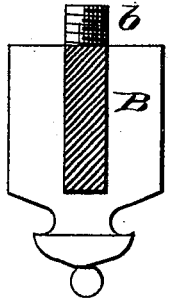
WITNESSES
Chas. H. Baker
Jas. L. Halley
INVENTOR
W. H. Fitz Gerald
By H. J. Ennis
Attorney (No Model.)   W. H. FITZ GERALD.   3 Sheets—Sheet 3.
PITCHER STAND.

No. 282,875.   Patented Aug. 7, 1883.

WITNESSES
Chas. H. Baker
Jas. L. Halley

INVENTOR
W. H. Fitz Gerald
By H. A. Ennis
Attorney

UNITED STATES PATENT OFFICE.

WALTER H. FITZ GERALD, OF CHICAGO, ILLINOIS, ASSIGNOR OF ONE-HALF TO WILLIAM M. DWYER, OF SAME PLACE.

PITCHER-STAND.

SPECIFICATION forming part of Letters Patent No. 282,875, dated August 7, 1883.

Application filed June 18, 1883. (No model.)

*To all whom it may concern:*

Be it known that I, WALTER H. FITZ GERALD, a citizen of the United States, residing at Chicago, in the county of Cook and State of Illinois, have invented certain new and useful Improvements in Pitcher-Stands, of which the following is a specification, reference being had therein to the accompanying drawings.

My invention has relation to stands for pitchers, water-coolers, and other articles in common use about the household; and the object of the invention is to provide a stand adapted for use in the household for the reception of various articles in daily use; and to that end the novelty consists in the construction of the same, as will be hereinafter more fully described, and particularly pointed out in the claims.

In the accompanying drawings similar letters of reference indicate like parts of the invention.

Figure 12:
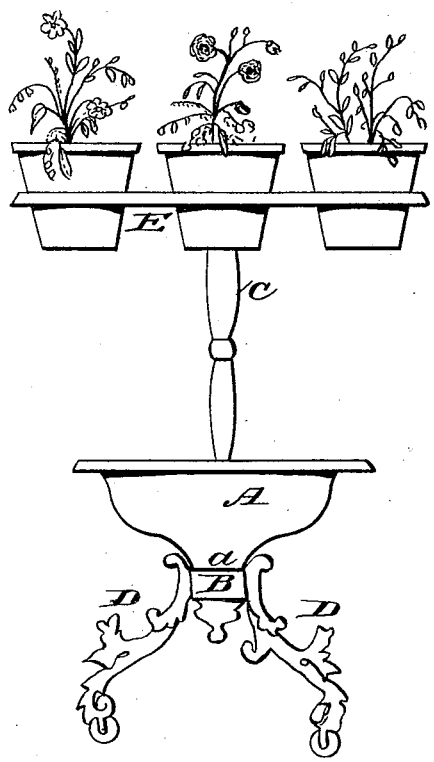
Figure 13:
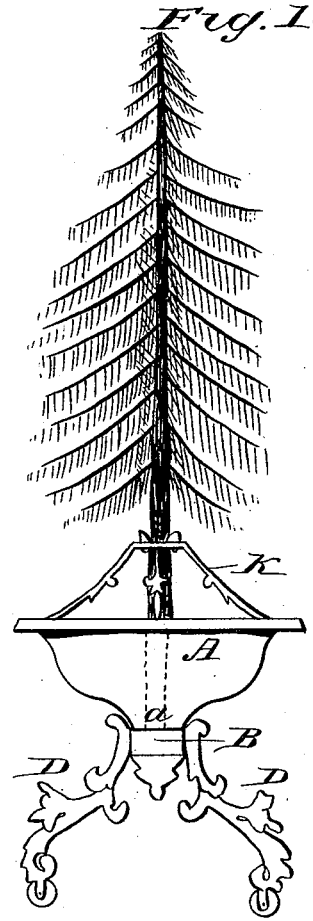
Figure 14:
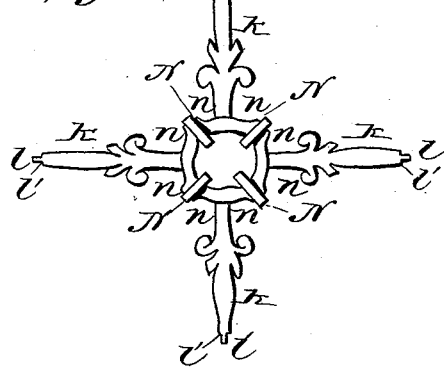
Figure 15:

Figure 1 is an elevation of my improved stand used as a support for ice-water; Fig. 2, a plan, and Fig. 3 a side view, of the drip-cup; Fig. 4, a view of the stand in use as an umbrella-rack; Fig. 5, a plan view of the shelf; Fig. 6, a plan of the shank or base; Fig. 7, a view of one of the legs; Fig. 8, the rubber washer. Fig. 9 is the standard detached; Fig. 10, a side elevation of the shank, showing slot for the reception of one of the legs; Fig. 11, a side view of the handle detached from the stand. Fig. 12 is a view showing the water-cooler removed and the stand in use as a flower-pot-holder. Fig. 13 is a similar view with the standard and shelf removed when the stand is used for Christmas-trees; Fig. 14, the Christmas-tree bracket, and Fig. 15 a view of one of the dogs used with the tree-holder.

A is the urn or basin, and may be made of any suitable cast, stamped, or molded material.

B is the shank, and is provided with a screw-stud, $b$, which projects through a hole in the bottom center of the basin, so as to receive a nut (not shown) and securely fasten said basin to the shank. This stud $b$ projects through the nut a sufficient distance to allow the threaded hole $c$ of the standard C to be securely screwed thereto. A rubber washer, $a$, is inserted between the bottom of the basin and the shank to make the joint water-tight.

D D are the legs, and may be cast in any ornamental style or design. These legs are provided with dovetailed lugs $d$, which fit into similar recesses or slots, $a'$, on the shank B.

The upper end of the standard C is provided with a screw-stud, $c'$, which passes through the central hole, $e$, in the shelf E, so that the parts may be secured together by a nut. (Not shown.) The central portion, $e'$, of the shelf E is concaved, so that the stud $c'$ will not project above the surface of said shelf.

F is a handle removably secured to the standard for convenience in lifting the stand from place to place.

The shelf E is provided with a series of holes, E', which may be used as holders for flower-pots, umbrellas, or any other use to which they are adapted. In the case of umbrellas or flowers, the drippings of water all fall into the basin, thus preventing damage to the carpet or floor. The rim of one of these holes E' is provided with two smaller holes, $e^2$, into which the teats $i$ of the drip-cup I are inserted, so as insure the proper position of the curved spout $i'$, and thus carry the waste water into the basin. The bottom of this drip-cup is concave to lead all the water out through the spout. The basin may have a cock to draw off the water when said basin is full.

When the stand is to be used as a holder for Christmas-trees, the standard is removed and the bracket K inserted as follows: The ends of the arms $k$ are provided with studs $l$, having shoulders $l'$, and the rim of the basin is provided with a series of holes or depressions corresponding to the arms $k$. The studs $l$ are then inserted in the holes, which is readily done by springing the frame-arms a little, when the pressure will hold them in place. The central frame, L, of the bracket K is cylindrical in form, and is provided with a series of pairs of upwardly-projecting lugs or ears, $n\ n$, and between each pair is secured a dog, N, by means of a rivet passing through the hole $n'$ in the dog, and similar holes in the lugs $n$, so that said dog will have play in and out from the center of the frame, or corresponding to its pivotal point. The inwardly-projecting curved face of this dog is provided with serrations or ratchet-shaped teeth $o$, so as to securely wedge and hold the trunk of the tree in position. To put the tree in place the trunk is passed through the frame L, so its end rests in the bottom of the basin. The dogs N are then adjusted, and the tree is rigidly secured in position, as shown in Fig. 13. Water may then be put in the basin to keep the tree fresh; or it may be filled with mosses or flowers to suit the taste.

I do not now claim the devices shown in Figs. 5, 6, and 7, as they will be the subject-matter of a separate application.

Having thus fully described my invention, what I claim as new and useful, and desire to secure by Letters Patent of the United States, is—

1. The basin A, having shank B, provided with the slots $a'$, in combination with the legs D, having projections $d$, as and for the purpose set forth.

2. The basin A, shank B, and legs D, in combination with the standard C, and shelf E, having a series of holes, $E'$, as and for the purpose set forth.

3. The basin A, mounted upon legs and provided with the standard C, having shelf E, one of the holes $E'$ of which has recesses $e^2\ e^2$, in combination with the drip-cup I, having teats $i\ i$, and curved spout $i'$, as and for the purpose set forth.

4. The basin A, provided with the washer $a$, in combination with the shank B, having legs D, as and for the purpose set forth.

In testimony whereof I affix my signature in presence of two witnesses.

WALTER H. FITZ GERALD.

Witnesses:
ROBERT HENDERSON,
JAMES CROSBY.